United States Patent
Regunathan et al.

(10) Patent No.: US 11,546,048 B2
(45) Date of Patent: Jan. 3, 2023

(54) VARIABLE LENGTH DVB-S2X SUPERFRAME FOR SATELLITE BEAM HOPPING SYSTEM

(71) Applicants: Murali Regunathan, Germantown, MD (US); Yezdi Antia, North Potomac, MD (US)

(72) Inventors: Murali Regunathan, Germantown, MD (US); Yezdi Antia, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/572,757

(22) Filed: Sep. 17, 2019

(65) Prior Publication Data

US 2021/0083762 A1     Mar. 18, 2021

(51) Int. Cl.
*H04B 7/185*     (2006.01)
*H04J 3/06*      (2006.01)
*H04J 3/22*      (2006.01)

(52) U.S. Cl.
CPC .......... *H04B 7/18513* (2013.01); *H04J 3/062* (2013.01); *H04J 3/22* (2013.01)

(58) Field of Classification Search
None
See application file for complete search history.

(56) References Cited

U.S. PATENT DOCUMENTS

| | | | |
|---|---|---|---|
| 2009/0081946 A1* | 3/2009 | Dankberg | H04B 7/18513 |
| | | | 455/3.02 |
| 2015/0188623 A1* | 7/2015 | Angeletti | H04B 7/2041 |
| | | | 455/13.3 |
| 2015/0318903 A1* | 11/2015 | Hirsch | H04B 7/01 |
| | | | 370/317 |

(Continued)

FOREIGN PATENT DOCUMENTS

| | | |
|---|---|---|
| WO | 2007064764 A3 | 5/2009 |
| WO | 2020144688 A1 | 7/2020 |

OTHER PUBLICATIONS

International Search Report for PCT Application No. PCT/US2020/049909.

(Continued)

*Primary Examiner* — Saad Khawar
(74) *Attorney, Agent, or Firm* — Capitol City TechLaw; Jasbir Singh

(57) ABSTRACT

A system and method for Time Division Multiplexing a signal for a beam hopping relay including generating the signal by interleaving first multi-variable length Super-Frames (VLSFs) with second multi-VLSFs; and transmitting the signal to the beam hopping relay. In the method, the first multi-VLSFs includes at least one first VLSF, the second multi-VLSFs includes at least one second VLSF, each of the first multi-VLSFs has a duration of a first dwell period, each of the second multi-VLSFs has a duration of a second dwell period, each of the at least one first VLSF and each of the at least one second VLSFs includes at least one (Continued)

SuperFrame unit (SFU). Further, the first dwell period is an integral multiple of the first duration, the second dwell period is an integral multiple of the second duration, and the first duration is different than the second duration.

16 Claims, 4 Drawing Sheets

(56) References Cited

U.S. PATENT DOCUMENTS

2017/0141906 A1  5/2017  Rainish
2017/0289939 A1* 10/2017  Hreha ................ H04B 7/18584

OTHER PUBLICATIONS

Pantelis-Daniel Arapoglou et al.: "DVB-S2X-enabled precoding for high throughput satellite systems: DVB-S2X-Enabled Precoding for High Throughput Satellite Systems", International Journal of Satellite Communications and Networking, vol. 34, No. 3, Jun. 18, 2016 (2016-06-18), pp. 439-455, XP055576228, GB Issn: 1542-0973, DOI: 10.1002/sat.1122.

* cited by examiner

VARIABLE LENGTH DVB-S2X SUPERFRAME FOR SATELLITE BEAM HOPPING SYSTEM

FIELD

A modified variable length DVB-S2X Annex E based waveform is introduced. This waveform includes Variable Length SuperFrames (VLSFs) including one or more "SuperFrame Units" or SFUs. Each SFU includes 16 Capacity Units (CUs) and 36 pilot symbols. The length of the VLSF may be varied to suit the carrier symbol rate and beam dwell period. Each dwell period may provide an integral multiple of the VLSFs. The last SFU of the last VLSF in a dwell period aids in gateway satellite synchronization, for example, by acting as a buffer for the satellite switch to occur.

BACKGROUND

The present disclosure alleviates problems with usage of a fixed and a very long SuperFrame (SF) length (for example, 612,540 symbols for DVB-S2). The prior art SF provides a common container that allows hosting different format-specific contents. In DVB-S2, each SF consists of exactly 612,540 physical layer symbols that are split among the following common elements and a constant SF length, independent of the container content fields:
  Start of SF (SOSF) is composed of 270 symbols containing a known sequence, chosen from a set of orthogonal Walsh-Hadamard (WH) sequences, to be used to detect the SF and to mark the start of the SF.
  SF format indicator (SFFI) consists of 450 symbols, embedding 4 bits of signaling information (robustly coded and spread over 450 symbols) that is used to identify 16 distinct SF formats.
  A common data/signaling field of 611,820 symbols can be allocated in several different ways to the actual physical layer frames according to the SFFI.
  The SF aligned scrambling sequence that is applied to the entire length of the SF symbols, with possibility of individual scrambling for signaling and payload elements. The scrambling sequence could also vary per beam in a multi-beam system.

As such, the time granularity and minimum dwell time associated with a fixed length long SuperFrame is very large. For example, at a symbol rate of 20 Mega Symbols per Second (Msps), the SuperFrame spans 30.627 ms, and as such a dwell time for beam hopping must be greater than or equal to 30.627 ms. Low latency applications would be adversely affected by such a large delay. Moreover, as the dwell time for a beam is fixed, multiple carriers to a single beam require an integral relationship in their symbol rates such that the SuperFrame from each carrier are aligned with the satellite switching time. As such, the resulting dwell time granularity is also restricted.

The present teachings alleviate these problems with a Variable Length Super Frame (VLSF).

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A system of one or more computers can be configured to perform operations or actions by virtue of having software, firmware, hardware, or a combination of them installed on the system that in operation causes or cause the system to perform the actions. One or more computer programs can be configured to perform operations or actions by virtue of including instructions that, when executed by data processing apparatus, cause the apparatus to perform the actions. One general aspect includes a method for Time Division Multiplexing (TDM) a signal for a beam hopping relay including: generating the signal by interleaving a first multi-variable length SuperFrames (VLSFs) with a second multi-VLSFs; and transmitting the signal to the beam hopping relay. In the method, the first multi-VLSFs includes at least one first VLSF, the second multi-VLSFs includes at least one second VLSF, each of the first multi-VLSFs has a duration of a first dwell period, each of the second multi-VLSFs has a duration of a second dwell period, each of the at least one first VLSF and each of the at least one second VLSFs includes at least one SuperFrame unit (SFU). Further, an SFU count of each of the at least one first VLSF is integral and greater than zero, an SFU count of the at least one second VLSF is integral and greater than zero, each of the at least one first VLSF has a first duration, each of the at least one second VLSF has a second duration, the first dwell period is an integral multiple of the first duration, the second dwell period is an integral multiple of the second duration, and the first duration is different than the second duration. Other embodiments of this aspect include corresponding computer systems, apparatus, and computer programs recorded on one or more computer storage devices, each configured to perform the actions of the methods.

Implementations may include one or more of the following features. The method further including deinterleaving, at the beam hopping relay, the signal to obtain the first multi-VLSFs for a first beam and the second multi-VLSFs for a second beam. The method further including relaying, from the beam hopping relay, the first beam for the first dwell period and the second beam for the second dwell period. The method where a first SFU of the at least one first VLSF includes a SOSF, a SFFI and eight capacity units (CUs), and each of any remaining SFUs of the at least one first VLSFs includes sixteen CUs. The method where each of the at least one SFUs concludes with a pilot count of pilot symbols and the pilot count is constant. The method where the first multi-VLSFs include a last VLSF that includes a last SFU that includes a beam hopping forward synchronization pattern (BHFSP) that acts as a buffer for timing synchronization between a transmitter and the beam hopping relay for beam hopping. The method where the SFU count of the at least one first VLSF is less than 416. The method where a carrier symbol rate for the first multi-VLSFs is different than a carrier symbol rate for the second multi-VLSFs. The method where the first multi-VLSF comprises multi-VLSFs of a first carrier and multi-VLSFs of a second carrier, a first carrier dwell period and a second carrier dwell period are equal to the first dwell period, and a carrier symbol rate for the multi-VLSFs of the first carrier is different than a carrier symbol rate for the multi-VLSFs of the second carrier. The method where the first dwell period and the second dwell period are integral multiples of a dwell period that is less than or equal to the first dwell period and the second dwell period. The method where the beam hopping relay is disposed in a satellite, and the transmitting is performed by a satellite gateway. The method where the beam hopping relay is disposed in a satellite gateway, and the transmitting is performed by a satellite. Implementations of the described techniques may include hardware, a method or process, or computer software on a computer-accessible medium.

One general aspect includes a system to time division multiplex (TDM) a signal for a beam hopping relay including: a signal generator to generate the signal by interleaving a first multi-variable length SuperFrames (VLSFs) with a second multi-VLSFs; and a transmitter to transmit the signal to the beam hopping relay, where the first multi-VLSFs include at least one first VLSF, the second multi-VLSFs include at least one second VLSF, each of the first multi-VLSFs has a duration of a first dwell period, each of the second multi-VLSFs has a duration of a second dwell period, each of the at least one first VLSF and each of the at least one second VLSFs includes at least one SuperFrame unit (SFU), an SFU count of each of the at least one first VLSF is integral and greater than zero, an SFU count of the at least one second VLSF is integral and greater than zero, each of the at least one first VLSF has a first duration, each of the at least one second VLSF has a second duration, the first dwell period is an integral multiple of the first duration, the second dwell period is an integral multiple of the second duration, and the first duration is different than the second duration. Other embodiments of this aspect include corresponding computer systems, apparatus, and computer programs recorded on one or more computer storage devices, each configured to perform the actions of the methods.

Additional features will be set forth in the description that follows, and in part will be apparent from the description, or may be learned by practice of what is described.

DRAWINGS

In order to describe the way, the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
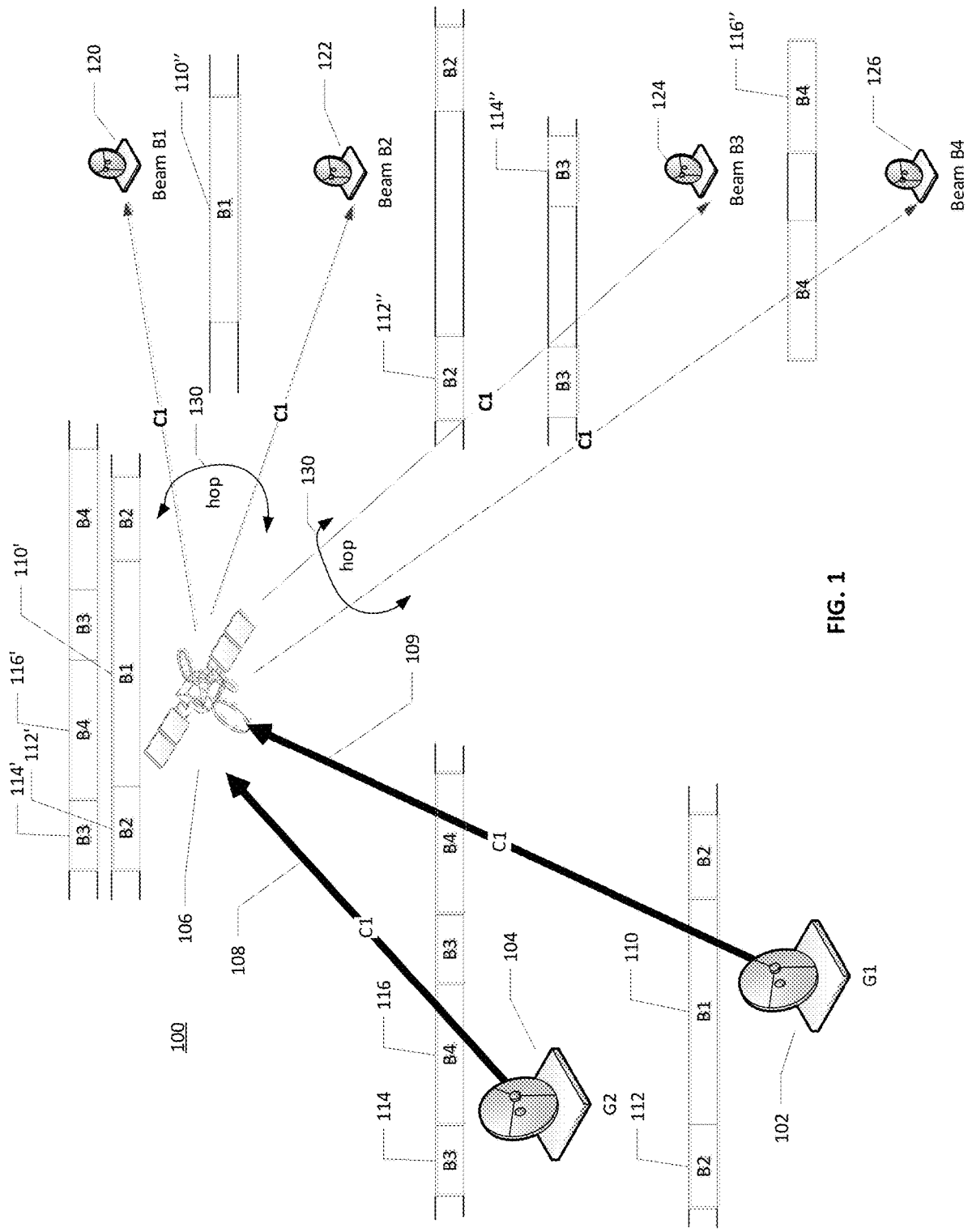
FIG. 1 is a schematic illustration of a forward beam hopping satellite system according to various embodiments.

Throughout the drawings and the detailed description, unless otherwise described, the same drawing reference numerals will be understood to refer to the same elements, features, and structures. The other circuit relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings may be a system, a method, and/or a computer program product at any possible technical detail level of integration. The computer program product may include a computer readable storage medium (or media) having computer readable program instructions thereon for causing a processor to carry out aspects of the present invention.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

INTRODUCTION

FIG. 1 is a schematic illustration of a forward beam hopping satellite system according to various embodiments.

FIG. 1 illustrates an exemplary forward beam hopping satellite system 100 configured as a generic use case of a beam hopping system ([{G1, B2, C1}] [{G1, B1, C1}]) and (([{G2, B3, C1}] [{G2, B4, C1}]. In the forward beam hopping satellite system 100, a gateway to terminal transmission is dynamically routed between user beams. The satellite 106 switching the spectrum between two different beams should switch outroute data per a BHTP at exactly the time as when the gateway (102 or 104) switches a forward spectrum to a different beam.

In the forward beam hopping satellite system 100, for example, a same carrier from one gateway is hopped to multiple beams in a Time Division Multiplexing (TDM) fashion via a satellite 106. The forward beam hopping satellite system 100 includes a gateway G1 102 communicating, through the satellite 106, with a user terminal (UT) 120 via beam B1 over channel C1 and a UT 122 via beam B2 also over channel C1. A signal 109 from G1 102 is hopped in a beam hopping unit 130 (shown as an arrow) in the satellite 106 for beam hopping occurring between the two beams B1 and B2.

Signal 109 includes a TX signal 110 from the G1 102 that is switched by the beam hopping unit to dwell on the UT 120 as a RX signal 110". TX signal 110 may be treated as hopped signal 110' at the satellite 106. Signal 109 includes a TX signal 112 from the G1 102 that is beamed to the UT 122 as a RX signal 112". TX signal 112 may be treated as hopped signal 112' at the satellite 106.

Similarly, a signal 108 from G2 104 is hopped in a beam hopping unit 130 (illustrated as an arrow) in the satellite 106 for beam hopping occurring between the two beams B3 and B4. Signal 108 includes a TX signal 114 from the G2 104 that is beamed to the UT 124 as a RX signal 114". TX signal 114 may be treated as hopped signal 114' at the satellite 106. Signal 108 includes a TX signal 116 from the G2 104 that is beamed to the UT 126 as a RX signal 116'. TX signal 116 may be treated as hopped signal 116' at the satellite 106.

Figure 2:
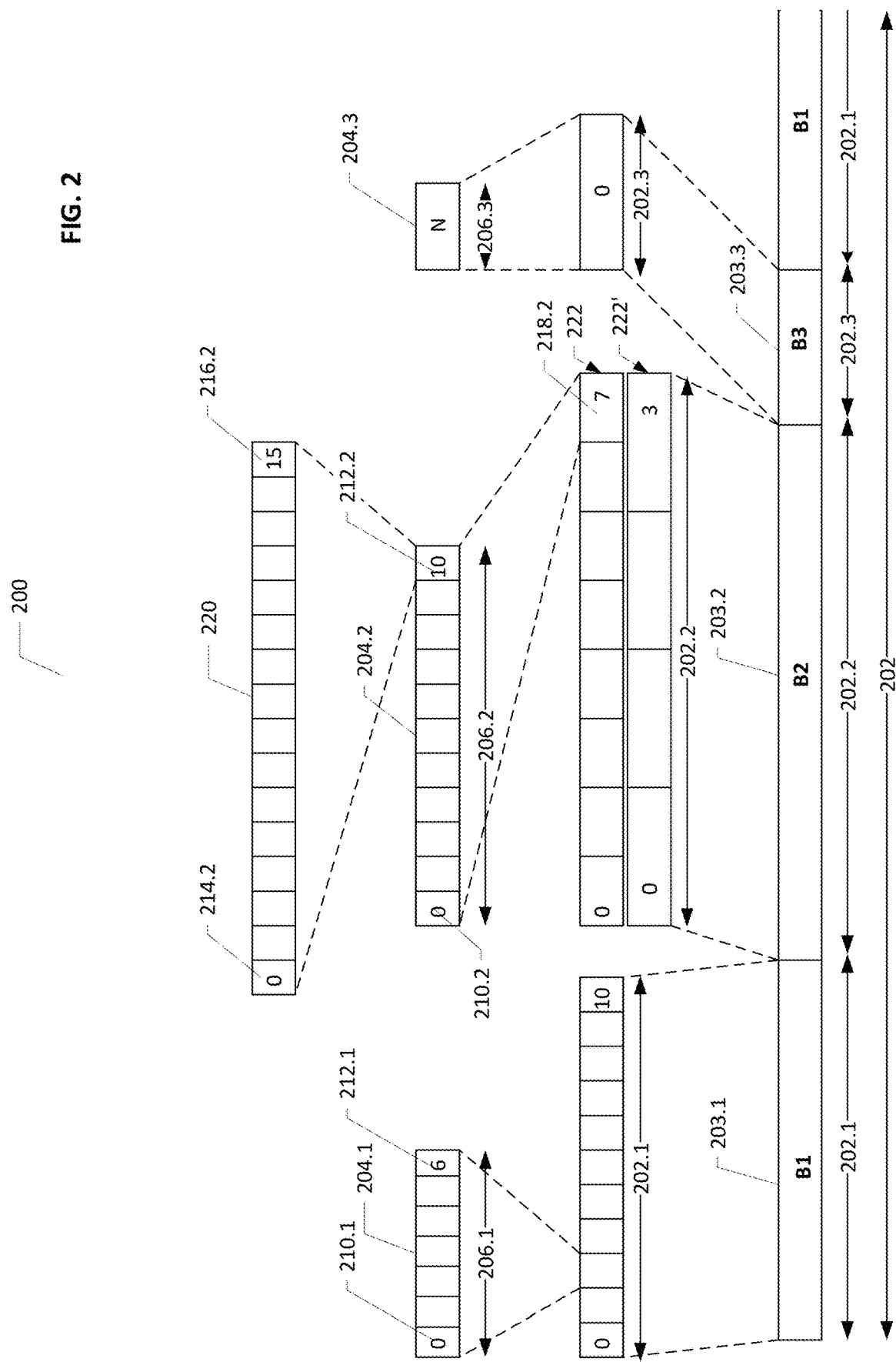
FIG. 2 illustrates a signal including Variable Length SuperFrames (VLSFs) according to various embodiments.

FIG. 2 illustrates a modified variable length DVB-S2X SuperFrame (VLSF) according to various embodiments.

FIG. 2 illustrates an architecture 200 including a signal 202 including multi-VLSFs 203.1, 203.2, 203.3 to be transmitted as beam B1, beam B2, and beam B3, respectively, by a beam hopping unit in a satellite or relay per a BHTP. The beam hopping unit effectively deinterleaves the signal 202 into the multi-VLSFs 203.1, 203.2, 203.3 prior to transmission. The multi-VLSFs 203.1, 203.2, 203.3 may repeat, for a defined period, or infinitely. Each of the multi-VLSFs 203.1, 203.2, 203.3 may be of different durations 202.1, 202.2, 202.3, respectively. The durations 202.1, 202.2, 202.3 match beam dwell periods of a Beam Hopping Time Plan (BHTP). Each of the multi-VLSFs 203.1, 203.2, 203.3 may include one or more VLSFs 204.1, 204.2, 204.3, respectively. The count of VLSFs in a multi-VLSF may vary for each of the multi-VLSFs 203.1, 203.2, 203.3. Herein, for example, the count of VLSFs for the multi-VLSFs 203.1, 203.2, 203.3 is 11, 8, 1, respectively.

For a given multi-VLSF, each VLSF will be of the same duration and the same number of physical layer symbols within. Moreover, for a given beam, each signal segment in the beam has the same count of VLSFs (for examples, the same count of VLSFs 204.1 in the segments of B1 in the signal 202).

However, the duration of VLSFs 204.1, 204.2, 204.3 across beams B1, B2, B3 may differ. Similarly, the number of physical layer symbols in each VLSF across beams B1, B2, B3 may differ. For example, the duration of VLSFs 204.1, 204.2, 204.3 may be 206.1, 206.2, 206.3, respectively. Each VLSF may be segmented into SuperFrame Units (SFUs) that in turn may be segmented into Capacity Units (CUs), where an SFU contains the same number of physical layer symbols (1476 symbols of an SFU divided into 16 CUs of 90 payload symbols and 36 pilot symbols, in this example). For example, VLSFs 204.1, 204.2, 204.3 may include 7, 11, and N SFUs, respectively. The N SFUs may be any count from 1 to 415 in the modified DVB-S2 VLSF. Each of the VLSFs 204.1, 204.2, 204.3 may have a different symbol rate.

The count of symbols in each SFU of each of the VLSFs 204.1, 204.2, 204.3 is the same; however, a duration of each SFU of each of the VLSFs 204.1, 204.2, 204.3 may differ as the SFU duration depends on a symbol rate for the respective VLSFs 204.1, 204.2, 204.3.

VLSF 0 and VLSF 10 of the multi-VLSF 203.1 are its first and last VLSFs. Similarly, VLSF 0 and VLSF 7 of the multi-VLSF 203.2 are its first and last VLSFs. VLSF 0 of the multi-VLSF 203.3 (or VLSF 204.3) is its first and last VLSF. SFUs 210.1 and 212.1 are the first and last SFUs, respectively, of the VLSF 204.1. SFUs 210.2 and 212.2 are the first and last SFUs of the VLSF 204.2. When the count of SFUs N is 1, VLSF 0 of the VLSF 204.3 is its first and last SFU; otherwise, the zeroth and N−1 SFU of the VLSF 204.3 are its first and last SFU, respectively. An SFU of a VLSF may include a first and last CU. For example, CU 216.2 is the last CU of the last SFU 212.2 of the last VLSF 218.2 of the multi-VLSF 203.2; CU 216.2 is also the last CU of the multi-VLSF 203.2.

The signal 202 includes interleaved multi-VLSFs 203.1, 203.2, 203.3. Interleaving herein means appending at an end of a multi-VLSF another multi-VLSF. In some embodiments, there may be a small buffer to align the multi-VLSFs with a BHTP and to allow for a duration required to the satellite/relay to switch from one beam to another according to the BHTP. The buffer may be disposed in the last few CUs and pilot symbols (see FIG. 3) of the last SFU in the last VLSF of the multi-VLSF, i.e., CUs immediately preceding and including CU 216.2 when disposed in SFU 212.2 of VLSF 218.2 of segment 203.2 of beam B2.

In some embodiments, the beam B2 may include multiple carriers, namely 222 and 222'. The dwell time of carrier 222 and carrier 222' is the same as the beam dwell time 202.2 of beam B2. The count of VLSFs in carrier 222 and carrier 222' (8 and 4 respectively) may be different, as long as the beam dwell period 202.2 of beam B2 is an integral multiple of a duration of each of the VLSFs in carrier 222 and carrier 222' (see for example Tables III and IV below). The symbol rate of VLSFs in carrier 222 and carrier 222' may be different see for example Tables III and IV below).

Figure 3:
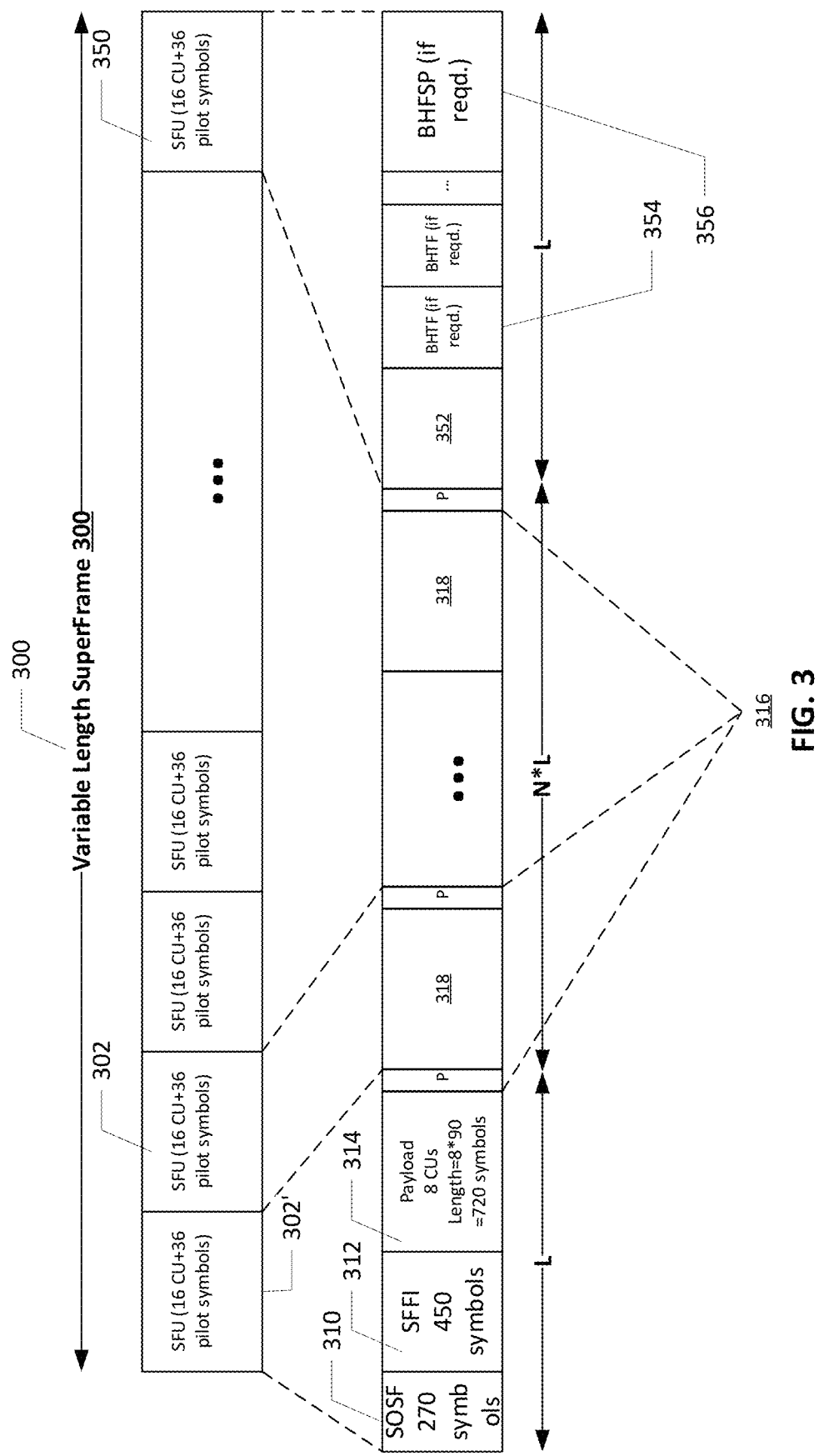
FIG. 3 illustrates a VLSF according to various embodiments.

FIG. 3 illustrates a modified Variable Length SuperFrame (VLSF) according to various embodiments.

A VLSF 300 includes multiple SuperFrame Units or SFUs 302. The VLSF may be considered to a modified variable length DVB-S2X waveform. The VLSF 300 has a variable length and can span anywhere from 1 to N SuperFrame Units (SFUs).

Each VLSF may include a first SFU 302' and a N number of general SFUs 302, where N is an integer of 0 or greater (capped at 415 for DVB-S2X compatibility). A last SFU 350 may be included at an end of the VLSF 300, when the VLSF 300 is the last VLSF in a multi-VLSF (see FIG. 2). When the VLSF 300 is not the last VLSF in a multi-VLSF, a last SFU 350 may be the same as a general SFU 302. Regardless of an SFU type, first SFU 302', general SFU 302, last SFU 350, the SFU can contain the same number of symbols L therein. When compatibility with DVB-S2X is desired, the VLSF 300 may contain a maximum of 415 SFUs. Each first SFU 302', general SFU 302, last SFU 350 in the VLSF 300 includes the same number of symbols L, for example, 1476 symbols.

The general SFU 302 includes a payload 318 having L symbols therein, for example, L of 1476. For a DVB-S2X compliant VLSF 300, the payload 318 is considered to have 16 capacity units (CUs) of 90 symbols in length and 36 pilot symbols following the 16 CUs for a total of 1476 (16*90+ 36) symbols in each general SFU 302.

The first SFU 302' is the same length L as the general SFU 302. The first SFU 302' may include a SOSF 310 and a SFFI 312. In some embodiments, the SOSF 310 may include 270 symbols while the SFFI 312 includes 450 symbols (defined in DVB-S2X Annex E) for a total of 720 (i.e., 8*90) symbols to form the SOSF plus the SFFI. As such, the first SFU 302' may include a half payload 314 spanning 8 CUs or 720 symbols rather than 1440 symbols delivered by the general SFU 302. The first SFU 302' is terminated by a fixed count of pilot symbols 316, for example, a pilot count of 316.

When present, a last SFU 350 of the VLSF 300 might include a unique pattern, for example, symbols for a Beam Hopping Forward Synchronization Pattern (BHFSP) 356. The unique pattern may act as a guard time to allow for satellite switching and to aid in Gateway to satellite synchronization. The pilot symbols in the last SFU 350 may be part of the BHFSP 356. The last SFU 350 may include a partial payload 352 that is less than 16 CUs in length. The last SFU 350 may include X number of the BHTF 354 as padding such that the length of the last SFU 350 is L or the same length as all other SFUs in the VLSF 300.

Multiple consecutive VLSFs 300 may be communicated in a beam dwell period defined by the BHTP. In some embodiment, the partial payload 352, the BHTF 354 and the BHFSP 356 are present only in the last SFU 350 of a concluding or last one of the VLSFs 300 in the beam dwell period. For example, if a beam dwell period can accommodate two (2) VLSFs 300, only the last SFU of the second VLSF may include the partial payload 352, the BHTF 354 and the BHFSP 356; the last SFU of the first VLSF would be a general SFU 302 including a regular payload of 1440 symbols and 36 pilot symbols.

The dwell time in a beam contains an integral multiple of the VLSF. The shortest VLSF may be equivalent to one (1) SFU or 1476 symbols and the longest VLSF may consist of 415 SFUs or 612540 symbols.

In some embodiments, the number of SFUs or a length of the VLSF 300 may be fixed (not dynamically changing) during operation or after initialization of a satellite communication system. In such embodiments, each Outroute carrier may have a fixed VLSF length known to the terminal and the gateway. If the Beam Hopping Time Plan (BHTP) is changed, the VLSF length might need to be changed. A change in the VLSF length may require the system to go through a VLSF acquisition phase. Between hops, the symbol rate and the VLSF length of the carriers to one beam will remain the same, but to different beams it can change. This may necessitate the modulator at the gateway to switch symbol rates of each carrier between hops.

The payload symbols of each SFU may include of PLFRAMEs or XFECFRAMEs as defined in the DVB-S2X specification. The PLFRAME may include a PLS Header followed by a FEC FRAME. In some embodiments, to ease receiver complexity, the PLFRAME may not be split between two dwell times of a beam, hence only an integer number of PLFRAMES may be provided in each dwell time. When the payload symbols are insufficient to fill up the last SFU 350 of the VLSF, a dummy or filler symbol may be used. A Beam Hopping tracking filler (BHTF) may include of 1 CU of 90 symbols usable as the dummy symbols. The BHFSP may have a length equivalent to m*90+36 symbols, as it includes the last pilot symbol block. The minimum length of the BHFSP is equivalent to 36 symbols. The BHFSP can span multiple SFUs if required and its length will depend upon the symbol rate of the carrier.

Short Latency

TABLE I

Example scenarios with shortest and longest VLSF length

| Case | 1 | 2 | 3 | 4 | 5 | 6 |
|---|---|---|---|---|---|---|
| SFU Count | 1 | 1 | 1 | 1 | 415 | 415 |
| VLSF Length (Symbols) | 1476 | 1476 | 1476 | 1476 | 612540 | 612540 |
| Symbol Rate (Msps) | 20 | 500 | 20 | 500 | 20 | 500 |
| Time per SFU (us) | 73.8 | 2.952 | 73.8 | 2.952 | 30627 | 1225.08 |
| Number of VLSFs | 1 | 1 | 45 | 45 | 1 | 1 |
| Total Dwell time (ms) | 0.0738 | 0.002952 | 3.321 | 0.13284 | 30.627 | 1.22508 |
| Payload Symbols | 720 | 720 | 32400 | 32400 | 596880 | 596880 |
| Payload bits (Assuming 16APSK) | 2880 | 2880 | 129600 | 129600 | 2387520 | 2387520 |
| PLFRAMES (64800 bits) | 0.044444 | 0.044444 | 2 | 2 | 36.84444 | 36.84444 |
| Comments | <1 PLFRAME | <1 PLFRAME | | | | |

The shortest VLSF size is 1 SFU or 1476 symbols, out of which the number of payload symbols will be 720 as shown for cases 1 and 2 in Table I above. The time taken to transmit this frame is 73.8 microseconds (us) at 20 Mega symbols per second (Msps). A VLSF having one SFU is too short to transmit a complete PLFRAME in the time interval needed to transmit one SFU. To transmit/send two (2) full PLFRAMES requires at least 45 SFUs or about 3.321 milliseconds (ms) at 20 Msps. This should be acceptable latency delay in most applications. A higher symbol rate of 500 Msps reduces this time to a mere 0.13 ms.

Cases 5 and 6 of Table I list the data for a maximum length of the VLSF formed by having 415 consecutive SFUs in the maximum VLSF length at a symbol rate of 20 and 500 Msps, respectively. With the number of symbols in an SFU fixed at 1476, the number of symbols transferred with 415 SFUs is 612,540.

In some embodiments, a PLFRAME cannot be split between two beam dwell times, and a few BHTF symbols may be added to fill up the SFUs of the VLSF so that the number of PLFRAMEs in the VLSF remains integral. This adds inefficiency along with the BHFSP. This inefficiency is illustrated in Table II for 20 Msps and 500 Msps for an exemplary VLSF with a SuperFrame length of 12 SFUs. The inefficiency from the BHTF and the BHFSP is listed in the last row. This inefficiency does not consider the last block of pilot symbols that become part of the BHFSP.

TABLE II

Example scenarios with different VLSF length and inefficiency

| Case | 1 | 2 |
|---|---|---|
| SFU Count | 12 | 12 |
| VLSF Length (symbols) | 177121 | 17712 |
| symbol rate (Msps) | 20 | 500 |
| Time (us) | 885.6 | 35.424 |
| Number of VLSFs | 1 | 1 |
| Dwell time (ms) | 0.8856 | 0.035424 |
| Payload symbols | 16560 | 16560 |
| Payload bits (Assuming 16APSK) | 66240 | 66240 |
| PLFRAMES (64800 bits) | 1 | 1 |
| BHTF + BHFSP (symbols) | 396 | 396 |
| Inefficiency from BHTF + BHFSP (%) | 2.39 | 2.39 |

Multiple Symbol Rate Carriers

In the case of multiple symbol rate carriers servicing a beam, the dwell time being fixed introduces a constraint. The VLSF length, the number of VLSFs and the symbol rate must be adjusted to meet this constraint. The variable length of the VLSF helps achieve this. As the granularity of the VLSF length is in units of 16 CUs, the number of symbol rate and dwell time combinations achieved are not infinite. The inefficiency caused due to this constraint can be high in certain lower symbol rate combinations. Table III depicts a case with four carriers with each carrier servicing a beam whose dwell time is 2 ms. The illustrated symbol rates and VLSF lengths have been adjusted in this case to reduce inefficiency. The symbol rates chosen as an example here were close to (25, 50, 150 and 450 Msps) for each of the carriers respectively.

TABLE III

Example scenarios with multi carrier in a beam

| Carrier | 1 | 2 | 3 | 4 |
|---|---|---|---|---|
| SFU Count | 35 | 69 | 207 | 304 |
| VLSF Length (symbols) | 51660 | 101844 | 305532 | 448704 |
| symbol rate (Msps) | 25.83 | 50.922 | 152.766 | 448.704 |
| Time (us) | 2000 | 2000 | 2000 | 1000 |
| Number of VLSFs | 1 | 1 | 1 | 2 |
| Dwell time (ms) | 2 | 2 | 2 | 2 |
| Payload symbols | 49680 | 98640 | 297360 | 874080 |
| Payload bits (Assuming 16APSK) | 198720 | 394560 | 1189440 | 3496320 |
| PLFRAMES (64800 bits) | 3 | 6 | 18 | 53 |
| BHTF + BHFSP (symbols) | 1116 | 1476 | 5796 | 15516 |
| Inefficiency from BHTF + BHFSP (%) | 2.17 | 1.46 | 1.94 | 1.77 |

Receiver complexity may be reduced by setting the dwell time for each beam, in a beam hopping cycle, to be integral multiples of a shortest dwell time in a beam hopping cycle. The VLSF length for each of the different carriers in the beam hopping cycle may be set to the shortest dwell time. By using the shortest dwell time, the system can ensure that the receiver will search for the new SOSF only at the VLSF length interval and not all the time.

Table IV below shows an example of 2 beams with 2 carriers each having their dwell times as a multiple of 0.8 ms. The symbol rates chosen were close to (50, 100, 200, 500 Msps) for each of the carriers respectively.

TABLE IV

| Example with minimum dwell time 0.8 ms | | | | |
|---|---|---|---|---|
| Beam | 1 | 1 | 2 | 2 |
| Carrier | 1 | 2 | 1 | 2 |
| SFU Count | 27 | 54 | 108 | 271 |
| VLSF Length (symbols) | 39852 | 79704 | 159408 | 399996 |
| symbol rate (Msps) (close to an integral of 50 Msps) | 49.815 | 99.63 | 199.26 | 499.995 |
| Time (us) | 800 | 800 | 800 | 800 |
| Number of VLSFs | 4 | 4 | 6 | 6 |
| Dwell time (ms) | 3.2 | 3.2 | 4.8 | 4.8 |
| Payload symbols | 152640 | 308160 | 928800 | 2337120 |
| Payload bits (Assuming 16APSK) | 610560 | 1232640 | 3715200 | 9348480 |
| PLFRAMES (64800 bits) | 9 | 19 | 57 | 144 |
| BHTF + BHFSP (symbols) | 6876 | 396 | 5436 | 4356 |
| Inefficiency from BHTF + BHFSP (%) | 4.48 | 0.12 | 0.58 | 0.18 |

The ability to achieve a combination of a certain symbol rate and dwell time is dependent on the granularity of the VLSF length. The minimum VLSF length supported, for examples, 16 CUs above, constraints the combinations of symbol rate and dwell time that can be achieved and introduces higher inefficiencies at lower symbol rates. By reducing the minimum VLSF length to 1 CU better symbol rate and time granularity may be achieved. Efficiencies may be improved by allowing the PLFRAME to cross dwell times, as the need for dummy BHTF symbols may be reduced or eliminated. A minimum fixed inefficiency due to the BHFSP present at the end of every multi-VLSF may not be eliminated.

Figure 4:
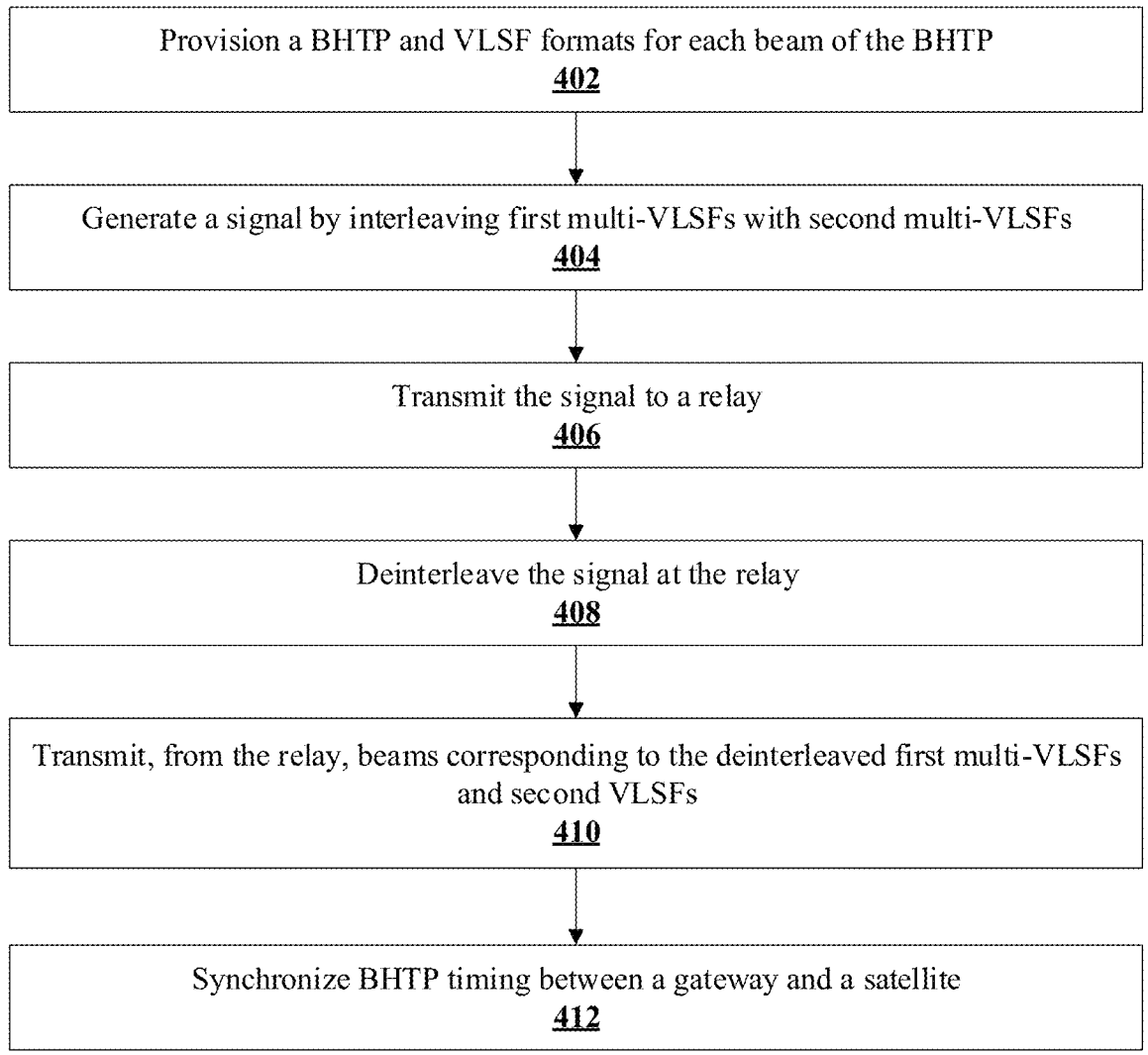
FIG. 4 illustrates a process for time division multiplexing (TDM) a signal for a beam hopping satellite, according to various embodiments.

FIG. 4 illustrates a process for time division multiplexing (TDM) a signal for a beam hopping satellite, according to various embodiments.

A process 400 for time division multiplexing (TDM) a signal for a beam hopping satellite may include operation 402 to provision a BHTP and VLSF formats for each beam of the BHTP. The process 400 may include an operation 404 to generate a signal by interleaving first multi-VLSFs with second multi-VLSFs. In some embodiments, the BHTP may define N beams, where N is 2, 3, 4, 5 or greater, to be transmitted from the gateway to a satellite (or vice-versa) over a channel. In such embodiments, the interleaving may interleave N format multi-VLSFs per the BHTP, where at least one of the N format-VLSFs is of a different format than a remaining of the N format VLSFs.

The process 400 may include an operation 406 to transmit the signal to a relay. The process 400 may include an operation 408 to deinterleave the signal at the relay. The process 400 may include an operation 410 to transmit, from the relay, beams corresponding to the deinterleaved first multi-VLSFs and second VLSFs. The process 400 may include an operation 404 to synchronize BHTP timing between a gateway and a satellite.

The relay may be a Geosynchronous Earth Orbit satellite, Medium Earth Orbit satellite, Low Earth Orbit satellite, or a High-Altitude Platform. In some embodiments, a satellite may do the interleaving per operation 404, where the different format multi-VLSFs are received from a user terminal or the like. In such embodiments, the satellite may transmit the signal to gateway per operation 406 and the gateway may act as the relay that deinterleaves the received signal per operation 408.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Further, implementations consistent with the subject matter and scope of this disclosure may have more or fewer acts than as described or may implement acts in a different order than as shown. Accordingly, the appended claims and their legal equivalents should only define the invention, rather than any specific examples given.

We claim as our invention:

1. A method for time division multiplexing (TDM) a signal for a beam hopping relay comprising:
generating the signal by interleaving first multi-Variable Length SuperFrames (VLSFs) with second multi-VLSFs;
transmitting the signal to the beam hopping relay; and
deinterleaving, at the beam hopping relay, the signal to obtain the first multi-VLSFs for a first beam and the second multi-VLSFs for a second beam,
wherein a carrier symbol rate of a first carrier used for the first multi-VLSFs is different than a carrier symbol rate of a second carrier used for the first multi-VLSF,
wherein the first multi-VLSFs comprise at least one first VLSF,
the second multi-VLSFs comprise at least one second VLSF,
each VLSF of the first multi-VLSFs has a duration of a first dwell period,
each VLSF of the second multi-VLSFs has a duration of a second dwell period,
each of the at least one first VLSF and each of the at least one second VLSFs comprises at least one SuperFrame Unit (SFU),
an SFU count of each of the at least one first VLSF is integral and greater than zero,
an SFU count of the at least one second VLSF is integral and greater than zero,
each of the at least one first VLSF has a first duration comprising multiple symbols,
each of the at least one second VLSF has a second duration comprising multiple symbols,
the first dwell period is an integral multiple of the first duration, the second dwell period is an integral multiple of the second duration, and the first duration is different than the second duration.

2. The method of claim 1, further comprising relaying, from the beam hopping relay, the first beam for the first dwell period and the second beam for the second dwell period.

3. The method of claim 1, wherein a first SFU of the at least one first VLSF comprises a Start of SuperFrame (SOSF), a SuperFrame Format Indicator (SFFI) and eight Capacity Units (CUs), and each of any remaining SFUs of the at least one first VLSFs comprises sixteen CUs.

4. The method of claim 1, wherein each of the at least one SFUs concludes with a pilot count of pilot symbols and the pilot count is constant.

5. The method of claim 1, wherein the SFU count of the at least one first VLSF is less than 416, the SFU count of the at least one second VLSF is less than 416, and the at least one SFU accommodates 1476 symbols.

6. The method of claim 1, wherein the first multi-VLSFs comprise a last VLSF that comprises a last SFU that comprises a Beam Hopping Forward Synchronization Pattern (BHFSP) that acts as a buffer for timing synchronization between a transmitter and the beam hopping relay for beam hopping.

7. The method of claim 1, wherein the first multi-VLSFs comprise multi-VLSFs of a first carrier and multi-VLSFs of a second carrier, a first carrier dwell period and a second carrier dwell period are equal to the first dwell period, and a carrier symbol rate for the multi-VLSFs of the first carrier is different than a carrier symbol rate for the multi-VLSFs of the second carrier.

8. The method of claim 1, wherein the first dwell period and the second dwell period are integral multiples of a dwell period that is less than or equal to the first dwell period and the second dwell period.

9. The method of claim 1, wherein the beam hopping relay is disposed in a satellite, and the transmitting is performed by a satellite gateway.

10. The method of claim 1, wherein the beam hopping relay is disposed in a satellite gateway, and the transmitting is performed by a satellite.

11. A system to time division multiplex (TDM) a signal for a beam hopping relay comprising:
a signal generator to generate the signal by interleaving first multi-Variable Length SuperFrames (VLSFs) with second multi-VLSFs;
a transmitter to transmit the signal to the beam hopping relay; and
a beam hopping relay to deinterleave the signal to obtain the first multi-VLSFs for a first beam and the second multi-VLSFs for a second beam,
wherein a carrier symbol rate of a first carrier used for the first multi-VLSFs is different than a carrier symbol rate of a second carrier used for the first multi-VLSF,
wherein the first multi-VLSFs comprise at least one first VLSF,
the second multi-VLSFs comprise at least one second VLSF,
each VLSF of the first multi-VLSFs has a duration of a first dwell period,
each VLSF of the second multi-VLSFs has a duration of a second dwell period,
each of the at least one first VLSF and each of the at least one second VLSFs comprises at least one SuperFrame Unit (SFU),
an SFU count of each of the at least one first VLSF is integral and greater than zero,
an SFU count of the at least one second VLSF is integral and greater than zero,
each of the at least one first VLSF has a first duration comprising multiple symbols,
each of the at least one second VLSF has a second duration comprising multiple symbols,
the first dwell period is an integral multiple of the first duration,
the second dwell period is an integral multiple of the second duration, and
the first duration is different than the second duration.

12. The system of claim 11, wherein the SFU count of the at least one first VLSF is less than 416, the SFU count of the at least one second VLSF is less than 416, and the at least one SFU accommodates 1476 symbols.

13. The system of claim 11, wherein the first multi-VLSFs comprise a last VLSF that comprises a last SFU that comprises a Beam Hopping Forward Synchronization Pattern (BHFSP) that acts as a buffer for a timing synchronization between a transmitter and the beam hopping relay for beam hopping.

14. The system of claim 11, wherein the first dwell period and the second dwell period are integral multiples of a dwell period that is less than or equal to the first dwell period and the second dwell period.

15. The system of claim 11, wherein the first multi-VLSFs comprises multi-VLSFs of a first carrier and multi-VLSFs of a second carrier, a first carrier dwell period and a second carrier dwell period are equal to the first dwell period, and a carrier symbol rate for the multi-VLSFs of the first carrier is different than a carrier symbol rate for the multi-VLSFs of the second carrier.

16. The system of claim 11, wherein the beam hopping relay is disposed in a satellite, and the transmitting is performed by a satellite gateway.

* * * * *